Patented Oct. 1, 1935

2,015,806

UNITED STATES PATENT OFFICE 2,015,806

PROCESS FOR EFFECTING ADHESION

Adolf Menger, Krefeld-Bockum, Germany, assignor, by mesne assignments, to Unyte Corporation, New York, N. Y., a corporation of Delaware No Drawing. Application March 3, 1934, Serial No. 713,943. In Germany March 11, 1933

8 Claims. (Cl. 154—2)

The present invention relates to a process for effecting adhesion by applying separately on the surfaces to be cemented two substances which react with one another to yield an adhesive layer. In carrying the invention into practice especially a urea formaldehyde condensation product is employed together with a substance which acts in such a maner as to cause the layer to harden. The cementing process can be carried out at the ordinary temperature, but can also be accomplished at an elevated temperature.

Accordingly the invention is applicable for cementing materials of all kinds, for example, paste board, vulcanized fibre and particularly wood with wood or with the materials mentioned before and furthermore with textiles etc.

It is already known to glue or cement together wood, particularly ply-wood and furniture wood, by employing aqueous solutions of condensation products of urea, thiourea or derivatives thereof and aldehydes or polymers thereof, as well as hardening agents, such as acids, acid salts or substances which split off acids. In these known processes a mixture of the condensation product and the hardening agent is applied to the surfaces to be cemented. When a hardening agent which acts comparatively slowly is used, the adhesion requires a correspondingly long setting period. If, however, a mixture of a quickly acting hardener with the adhesive is resorted to, the mixture sets prematurely and, for example, when employing the mixture for cementing larger surfaces the portion first applied hardens before the whole surface to be cemented is covered.

The above mentioned disadvantages are avoided in accordance with the present invention, whereby the intermixing of the two constituents which react with one another is first allowed to proceed on or between the two surfaces to be cemented together.

As basic materials for this process come into consideration natural adhesives and especially such artificial materials as are applicable as adhesives, which can be set by means of a hardening agent.

Among the artificial materials which are especially adapted for the process of the present application are to be mentioned the condensation products of urea or thiourea with aldehydes, especially with formaldehyde and in particular aqueous solutions of the latter condensation products, such as can be obtained, for example, in accordance with the process described in the co-pending application Serial No. 467,384, filed July 11, 1930.

Among the compounds suitable as hardening agents for the aldehyde urea condensation products may be mentioned acids, such as hydrochloric acid, sulphuric acid, phosphoric acid and acetic acid, oxalic acid and lactic acid, acid acting salts, such as acid sodium sulphate, mono ammonium phosphate and aluminium chloride and substances splitting off acids when incorporated in the adhesive mixture, such as ammonium chloride and ammonium sulphate. Further additions, such as, for example, starch potato flour, ground potato flakes or fillers of the most varied kind can be incorporated with the adhesives, when required for special purposes.

In order to carry out the cementing process of this invention the hardening agent, preferably in a viscous state, (to prevent penetration to any marked extent into a material to be cemented), is with advantage applied in the form of a thin layer, then the adhesive is brushed thereon and the materials to be cemented are finally pressed together. When cementing materials where a penetration of the adhesive should be avoided, for example, when inlaying precious woods, it suffices to apply the hardening agent, as well as the adhesive, to only one of the surfaces to be cemented. In the case of thicker working materials, in which a penetration has no disadvantageous influence, the hardening agent and adhesive can be applied to both surfaces to be cemented.

The separate application of adhesive and hardening agent can likewise be carried out in such a manner that the adhesive is applied first and the adhesive layer is then coated by means of a solution of the hardening agent, for example, by spraying.

The invention is illustrated by, but not restricted to the following example; the parts are by weight:

Example

A solution of 20 parts by weight of ammonium chloride in 80 parts of water, advantageously with the addition of a thickening agent, such as for example hydrolyzed starch, is applied in the thinnest possible layer to both sides of a middle layer of pine wood. A solution of a formaldehyde urea condensation product is then applied, produced as follows:—

200 parts by weight of a 30% aqueous solution of formaldehyde are heated to 95° C. with 0.1 part by weight of mono sodium phosphate. A solution of 60 parts by weight of urea in 30 parts of water heated to 70° C. is added to the above solution.

After the addition of 0.15 part by weight of trisodium phosphate the solution is evaporated in vacuo at a temperature below 50° C. until a 35% solution of the condensation product is obtained.

Immediately after applying the two solutions, two binding layers of veneer are laid on and then pressure is applied for 1½ hours at the ordinary temperature. The resulting cemented material possesses a stability which is not attainable with other cold acting glues or cements.

The hardening solution, which is ammonium chloride in the present example, can equally well be applied to the covering layers of veneer, if desired or required also to all the surfaces to be cemented. This applies also to the use of the urea formaldehyde condensation product. The process can likewise be carried out in such a manner that the urea formaldehyde condensation product is first applied to the surfaces to be cemented and subsequently the ammonium chloride solution is applied thereupon, advantageously by spraying.

The joining together of the surfaces to be cemented, which has been treated as described above, can also be accomplished in the known manner at an elevated temperature, for example at a temperature up to about 150° C.

I claim:

1. Process which comprises applying separately on the surfaces of materials to be cemented an urea aldehyde condensation product and a substance exerting a hardening influence thereon and pressing together the objects to to be cemented.

2. Process which comprises applying separately on the surfaces of materials to be cemented an urea aldehyde condensation product and a substance exerting a hardening influence thereon and pressing together the objects to be cemented at an elevated temperature.

3. Process which comprises applying separately on the surfaces of materials to be cemented an aqueous solution comprising a urea formaldehyde condensation product and a substance exerting a hardening influence thereon and pressing together the objects to be cemented.

4. Process which comprises applying separately on the surfaces of materials to be cemented an aqueous solution comprising a urea formaldehyde condensation product and material selected from the group of acids, acid salts and substances which after incorporation with the adhesive mixture yield acids and pressing together the objects to be cemented.

5. Process which comprises applying separately on the surfaces of materials to be cemented an aqueous solution comprising a formaldehyde urea condensation product and an aqueous solution of ammonium chloride with the addition of hydrolyzed starch and pressing together the objects to be cemented.

6. Process which comprises applying separately on the surfaces of wood to be cemented an aqueous solution comprising a urea formaldehyde condensation product and material, selected from the group consisting of acids, acid salts and substances which after incorporation with the adhesive mixture yield acids, and pressing together the wood to be cemented.

7. Process which comprises applying separately on the surfaces of material, selected from the group consisting of ply wood and furniture wood, to be cemented an aqueous solution comprising a urea formaldehyde condensation product and an aqueous solution of ammonium chloride with the addition of hydrolyzed starch and pressing together the ply wood or furniture wood to be cemented.

8. Process which comprises applying separately on the surfaces of material, selected from the group consisting of ply wood and furniture wood, to be cemented an aqueous solution comprising a urea formaldehyde condensation product and material, selected from the group consisting of acids, acid salts and substances which after incorporation with the adhesive mixture yield acids, and pressing together the ply wood or furniture wood.

ADOLF MENGER.